Figure 1:
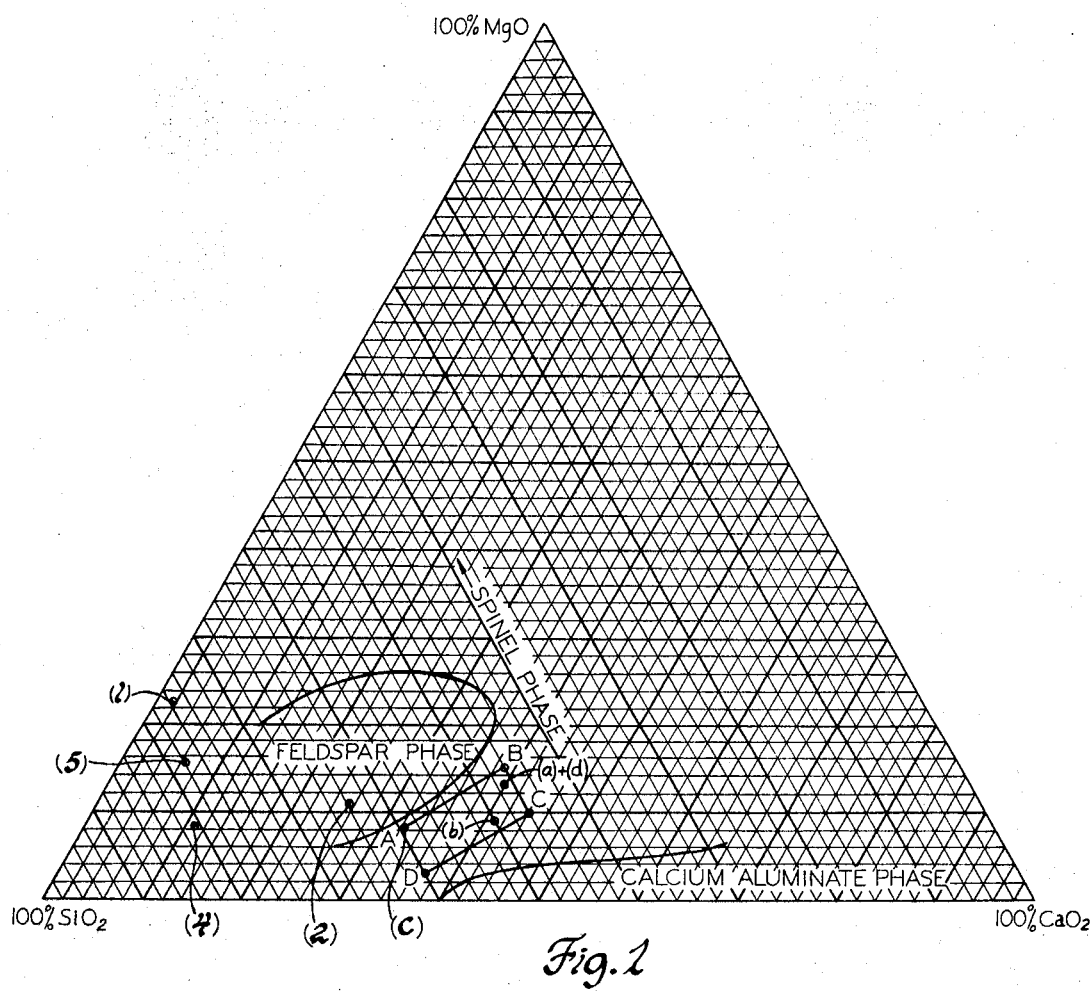

United States Patent

[11] 3,615,763

[72] Inventor William M. Flock
 Flint, Mich.
[21] Appl. No. 830,413
[22] Filed June 4, 1969
[45] Patented Oct. 26, 1971
[73] Assignee General Motors Corporation
 Detroit, Mich.

[54] HIGH-ALUMINA CERAMIC BODY AND METHOD OF MAKING SAME
 6 Claims, 2 Drawing Figs.
[52] U.S. Cl. .................................................. 106/46,
 29/25.12, 106/39 R, 106/65, 264/61, 313/118
[51] Int. Cl. ...................................................... C04b 33/26
[50] Field of Search ............................................. 106/39, 46,
 45, 65; 264/61, 63; 29/25.11, 25.12, 25.15;
 123/169; 313/118

[56] References Cited
 UNITED STATES PATENTS
2,436,005 2/1948 Hopps et al. .................. 106/46
3,167,438 1/1965 Bristow ......................... 106/46
3,238,048 3/1966 Somers.......................... 106/39
3,262,754 7/1966 Lindsay et al................. 106/65 X
 FOREIGN PATENTS
805,337 12/1958 Great Britain................. 106/46
 OTHER REFERENCES
Ceramic Raw Materials, Ceramic Industry Magazine, Chicago (Chaner's Publ.) 1967 (January) p. 63. [TP785C411]

*Primary Examiner*—Tobias E. Levow
*Assistant Examiner*—W. R. Satterfield
*Attorneys*—Sidney Carter and Peter A. Taucher ABSTRACT: This invention relates to sintered ceramic articles of the type usable as electrical insulators in an environment under which, body is subjected to wide ranges of temperature variation while meeting high-strength requirements and of the type also usable in other applications requiring high-strength and a high resistance to thermal shock such as the turbine and nuclear reactor parts; such a body consisting essentially of a reaction product which, calculated as oxides, approximates 94–96.5 weight percent $Al_2O_3$ and a mixture of $SiO_2$, CaO, and MgO which mixture falls within a parallelogram-shaped area on a weight percent triaxial diagram approximately bounded by the compositions represented as follows:

|         | Percent— |    |    |    |
|---------|----|----|----|----|
|         | A  | B  | C  | D  |
| $SiO_2$ | 60 | 46 | 46 | 60 |
| CaO     | 32 | 39 | 44 | 37 |
| MgO     | 8  | 15 | 10 | 3  |

INVENTOR.
William M. Flock
BY
Sidney Carter
ATTORNEY

HIGH-ALUMINA CERAMIC BODY AND METHOD OF MAKING SAME

In the manufacture of sintered high-alumina bodies of the type containing such materials as herein disclosed, as for example the ceramic articles disclosed in U.S. Pat. No. 3,167,438 of Robert H. Bristow, issued Jan. 26, 1965, the compositions of the body have been such as to obtain a maximum amount of glass crystallization, a relatively high modulus of elasticity and low resistance to thermal shock. Such bodies have also exhibited the characteristic of low-dielectric loss when used in a high-frequency electrical environment. By using the compositions of my invention, there are obtained ceramic bodies which are characterized by high-density, high-mechanical strength, and relatively high-dielectric losses at high frequency, while at the same time having a high resistance to thermal shock and therefore being resistant to spalling when subjected to wide variations in temperature. Sintered ceramic bodies such as contemplated by my invention are also obtainable by a one-step firing operation at a lower temperature than that taught by the prior art.

Accordingly, it is an object of my invention to provide a new and improved high-strength, high-density ceramic body having high resistance to thermal shock.

It is another object of my invention to provide an improved method for forming a high-alumina fired ceramic body having characteristics of high-density, high-mechanical strength and high resistance to thermal shock.

Figure 2:
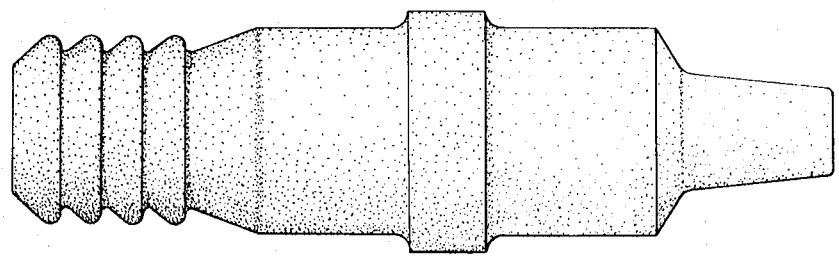

Further objects and advantages of my invention are apparent from the following description and the drawing in which:

FIG. 1 is a triaxial diagram indicating the composition of materials forming the ceramic bodies of my invention; and FIG. 2 represents a spark plug insulator formed in accordance with the teachings of my invention.

The ceramic bodies of my invention include materials which, when calculated as oxides, fall within the region bounded by the parallelogram indicated on the triaxial diagram of FIG. 1. I have found, on the basis of extensive tests, that sintered bodies having the material composition falling within the area of points A, B, C, and D of FIG. 1, and also containing alumina in the amount of from 94–96.5 weight percent, show an improvement in resistance to thermal shock in an amount of from 25–40 percent as well as an increase in strength of up to 40 percent.

As is well known, the physical properties of ceramic materials are dependent on atomic and crystal size and structure, particularly interatomic bonding and closeness of atomic packing. Thus, loosely packed structures such as glass allow expansion to take place internally and have a comparatively low coefficient of expansion. Also, in accordance with the "-hole" theory of such materials, glass has large holes through which ions can readily move with resultant relatively high power losses. Accordingly, where it is desired to have low power losses it is indicated that the glass constituent in a ceramic mix be subjected on firing to maximum devitrification or crystallization. In this regard, I have found that devitrification of glass in a ceramic mixture produces a relatively high modulus of elasticity.

As is also known in the art, the spalling-resistance index or index of resistance to thermal shock, the maximum temperature difference $\Delta T$. that can be withstood by a ceramic body is proportional to $kS/\alpha E$, where $k$ is the thermal conductivity, $S$ the strength, $E$ the modulus of elasticity, and $\alpha$ the coefficient of thermal expansion. It is apparent from this relationship that for a high resistance to thermal shock it would be necessary to produce a body having high-thermal conductivity and strength with a low modulus of elasticity and thermal expansion coefficient. In the case of ceramic bodies made in accordance with my invention this formula can be further simplified since the coefficients of thermal conductivity $k$ and the thermal expansion $\alpha$ are substantially constant for alumina bodies having approximately 90–98 percent alumina with the result that $\Delta T$. is proportional to $S/E$.

As indicated above, I have found that devitrification of the glass in mixtures of the type herein described normally creates a body having a high modulus of elasticity. However, I have also found that the presence of a small but controlled amount of MgO relative to the amounts of $SiO_2$ and CaO serves to minimize glass devitrification and crystallization. Such controlled amount of MgO crystallizes rapidly to form but a trace amount of crystalline phase of not more than about 3 percent by weight of spinel as determined by X-ray defraction and of a fine grain structure, and acts as a buffering or inhibiting agent to further crystallization. Thus, MgO in the controlled amounts of my invention is an essential ingredient.

I have found that fired bodies having the desired physical characteristics consist essentially of a reaction product which, calculated as oxides, approximates 94–96.5 weight percent $Al_2O_3$, the balance being $SiO_2$, CaO, and MgO which on a weight percent triaxial diagram defines a parallelogram-shaped area bounded approximately by the compositions represented by the points A, B, C, and D in FIG. 1 and as listed below in table 1.

TABLE 1

|  | A | B | C | D |
|---|---|---|---|---|
| $SiO_2$ | 60% | 46% | 46% | 60% |
| CaO | 32% | 39% | 44% | 37% |
| MgO | 8% | 15% | 10% | 3% |

Listed below in table 2 there are shown the compositions of fired bodies of my invention together with physical characteristics covering the Knoop microhardness which is a measure of density of the body structure, the modulus of strength (M of S) and the modulus of elasticity (M of E). The unparenthesized values for each constituent in each composition represents the parts by weight of the constituent whereas the parenthesized values represent the weight percent of each of the indicated constituents on the basis of the total constituents in the body other than the alumina. The parenthesized values have been shown on the phase diagram of FIG. 1 and fall within the parallelogram area which represents the compositional area of minimal devitrification of glass. By way of comparison with the prior art herein identified, it should be noted that the power factor of the compositions of my invention, those falling within the parallelogram area of FIG. 1, have a power factor of not less than 0.001 when measured at a frequency of 10 kmc.

TABLE 2

|  | (a) | (b) | (c) | (d) |
|---|---|---|---|---|
| $Al_2O_3$ | 94.5 | 95.5 | 96.2 | 95.7 |
| $SiO_2$ | 2.5 (47.2%) | 2.2 (50.0%) | 2.2 (59.5%) | 2.5 (47.2%) |
| CaO | 2.1 (39.6%) | 1.8 (40.9%) | 1.2 (32.4%) | 2.1 (39.6%) |
| MgO | .7 (13.2%) | .4 (9.1%) | .3 (8.1%) | 0.7 (13.2%) |
| Microhardness | 1,240 | 1,324 | 1,306 | 1,326 |
| M of S | $54.6 \times 10^3$ | $58.6 \times 10^3$ | $60 \times 10^3$ | $58.0 \times 10^3$ |
| M of E | $43.85 \times 10^6$ | $45.58 \times 10^6$ | $44.33 \times 10^6$ | $45.55 \times 10^6$ |
| $\Delta T \sim (S/E)$ | 1.24 | 1.30 | 1.40 | 1.29 |

By way of comparison with the high-alumina bodies covered by my invention, there is set forth below in table 3 the composition and physical characteristic data for typical high-alumina bodies falling outside the parallelogram area of FIG. 1. Such bodies are inferior to those of my invention in that the bodies of table 2 above have a resistance to thermal shock and a strength which is as much as 40 percent greater than those of table 3.

TABLE 3

|  | (1) | (2) | (3) | (4) | (5) |
|---|---|---|---|---|---|
| $Al_2O_3$ | 93.6 | 94.9 | 93.6 | 89.72 | 83.2 |
| $SiO_2$ | 4.4 (75.9%) | 3.0 (63.8%) | 2.3 (43.4%) | 8.0 (80.7%) | 13.2 (78.0%) |
| CaO | .1 (1.7%) | 1.2 (25.5%) | 3.6 (56.5%) | 1.1 (11.1%) | 1.1 (6.5%) |
| MgO | 1.3 (22.3%) | .5 (10.6%) | --- | .8 (8.1%) | 2.6 (15.4%) |
| Microhardness | 1,140 | 1,332 | 1,058 | 1,304 | 1,143 |
| M of S | 42×10³ | 53.7×10³ | 45.2×10³ | 44.1 | 39.4×10³ |
| M of E | 43.10⁶ | 52.1×10⁶ | 46.3×10⁶ | 42.0×10⁶ | 39.9×10⁶ |
| ΔT.~(S/E) | .976 | 1.04 | .98 | 1.05 | .986 |

By way of example and with reference to the preferred body formed in accordance with my invention and identified in table 2 as body (a), the following description represents the typical method used in forming such bodies.

A raw-batch mixture of commercially available constituents in approximately the parts by weight noted in table 4 below is milled in a rotary ball mill, well-known organics being added to the mixture to aid in "green" ware handling, such processing being in accordance with the teachings of A. V. Somers for dry-grinding, U.S. Pat. Nos. 3,238,048; 3,238,049; 3,252,809; and 3,252,810.

TABLE 4

|  | Body (a) | Body (c) |
|---|---|---|
| $Al_2O_3$ | 91.3 | 92.4 |
| Talc | 1.8 | 0.8 |
| Kaolin clay | 3.5 | 4.2 |
| Calcium carbonate | 3.4 | 2.4 |
| Organics (wax, oil, etc.) | 1.8 | 1.8 |

The mixture is then formed to the desired shape, i.e., pressed to form a spark plug insulator "green" body as shown in FIG. 2, which is then fired to produce the body of my invention identified in table 2 as noted for each listing of raw materials. While the body identified as (a) has a somewhat lower ΔT. value then that of body (c), I prefer to use the batch material for body (a) since it has superior mechanical handling properties, this being significant from a production standpoint.

I have found that the "green" pressed bodies formed as in FIG. 2 may be fired on a shorter time schedule and at a lower temperature than that taught by the prior art. More specifically, the bodies of my invention may be fired in either an oxidizing, neutral, or reducing atmosphere at a temperature of about 2,900° F., the bodies being held at this temperature for a period of from about one-half to 1 hour. The firing temperature may be reached on a firing schedule which is approximately equal in time in both the heating and cooling portions, the total firing time being about 20 hours. The prior art in this regard teaches a 24-hour firing schedule at about 2,975° F. It can be seen that there is a significant saving in time and money from a production standpoint.

From the foregoing description and drawing it can be seen that I have invented a series of compositions for fired ceramic bodies and a method of forming same which result in significantly improved strength and resistance to thermal shock as well as significant savings in processing. My invention has been described in detail with reference to specific embodiments all within the scope of the claims which follow.

What is claimed is:

1. A fired ceramic body having a high resistance to thermal shock, a modulus of strength of about 54–60×10³, less than about 3 percent of crystalline glass phase, said phase being spinel and consisting essentially of a reaction product which calculated as oxides approximates 94 to 96.5 percent by weight $Al_2O_3$ and materials which fall within the parallelogram-shaped area approximately bounded by the compositions represented by the points A, B, C, and D, on a percent by weight triaxial diagram for $SiO_2$–CaO–MgO as follows:

|  | A | B | C | D |
|---|---|---|---|---|
| $SiO_2$ | 60% | 46% | 46% | 60% |
| CaO | 32% | 39% | 44% | 37% |
| MgO | 8% | 15% | 10% | 3% | said body resulting from a single firing of the raw batch materials and having a power factor of not less than 0.001 measured at a frequency of 10 kmc.

2. A spark plug insulator, said insulator being a fired ceramic body in accordance with claim 1 wherein said constituents are present in approximately the following amounts 94.5 weight percent $Al_2O_3$, the balance on weight percent basis consisting essentially of 47.2% $SiO_2$, 39.6% CaO, and 13.2% MgO.

3. A spark plug insulator, said insulator being a fired ceramic body in accordance with claim 1 wherein said constituents are present in approximately the following amounts 96.2 weight percent $Al_2O_3$, the balance on weight percent basis consisting essentially of 59.5% $SiO_2$, 32.4% CaO, and 8.1% MgO.

4. A spark plug insulator, said insulator being a fired ceramic body in accordance with claim 1 wherein said constituents are present in approximately the following amounts 95.5 weight percent $Al_2O_3$, the balance on weight percent basis consisting essentially of 50.0% $SiO_2$, 40.9% CaO, and 9.1% MgO.

5. A spark plug insulator, said insulator being a fired ceramic body in accordance with claim 2 wherein said $Al_2O_3$ is present in an amount of approximately 95.7 weight percent.

6. In a method for forming a fired ceramic body as set forth in claim 1 wherein the selected raw batch materials are ground and pressed to form the desired body shape, the improvement comprising firing said body at a temperature of approximately 2,900° F. for a period of one-half to 1 hour to enable formation of a high-strength, high-thermal shock-resistant body at a relatively low temperature, the firing being conducted on a relatively short time schedule of approximately 20 hours with the heating and cooling portions being of approximately equal duration.

PO-1050
(5/69)

UNITED STATES PATENT OFFICE
CERTIFICATE OF CORRECTION

Patent No. 3,615,763　　　　　　　　Dated　October 26, 1971

Inventor(s) William M. Flock

It is certified that error appears in the above-identified patent and that said Letters Patent are hereby corrected as shown below:

In the Abstract, line 3, the "," should read -- the --.

Col. 2, line 1, after "90-98" insert the word -- weight --.

Col. 3, in TABLE 3 in Col. (5), line 2, close the parenthesis on "(78.0% ".

Signed and sealed this 18th day of April 1972.

(SEAL)
Attest:

EDWARD M.FLETCHER,JR.　　　　　　　　ROBERT GOTTSCHALK
Attesting Officer　　　　　　　　　　　Commissioner of Patents